(12) United States Patent
Feng et al.

(10) Patent No.: US 7,457,544 B1
(45) Date of Patent: Nov. 25, 2008

(54) SINGLE CHANNEL FOUR-PORT GROUP DELAY COMPENSATION EQUALIZER

(75) Inventors: John Feng, Union City, CA (US); Xuehua Wu, Union City, CA (US); Sanjai Parthasarathi, Los Altos, CA (US); Giovanni Bararossa, Saratoga, CA (US)

(73) Assignee: Avanex Corporation, Fremont, CA (US)

( * ) Notice: Subject to any disclaimer, the term of this patent is extended or adjusted under 35 U.S.C. 154(b) by 556 days.

(21) Appl. No.: 10/990,688

(22) Filed: Nov. 16, 2004

(51) Int. Cl.
*H04J 14/02* (2006.01)
(52) U.S. Cl. .............. 398/85; 398/79; 398/82; 398/83; 398/84; 398/87; 398/102; 398/161; 398/159; 398/180; 398/158; 385/24; 385/37; 385/14; 385/27; 385/33; 385/34; 385/31
(58) Field of Classification Search ............ 398/79, 398/82, 83, 84, 85, 87, 102, 161, 158, 159, 398/149, 180; 385/24, 37, 27, 14, 31, 33, 385/34
See application file for complete search history.

(56) References Cited

U.S. PATENT DOCUMENTS

| | | | | |
|---|---|---|---|---|
| 5,600,468 A * | 2/1997 | Barber | ............... | 398/42 |
| 6,137,604 A * | 10/2000 | Bergano | ............... | 398/1 |
| 6,381,049 B1 * | 4/2002 | Xu et al. | ............... | 398/82 |
| 6,618,193 B1 * | 9/2003 | Boertjes | ............... | 359/337.2 |
| 6,839,482 B2 * | 1/2005 | Margalit | ............... | 385/27 |
| 7,221,872 B2 * | 5/2007 | Liu et al. | ............... | 398/81 |

* cited by examiner

*Primary Examiner*—Hanh Phan
(74) *Attorney, Agent, or Firm*—Patterson & Sheridan, L.L.P.

(57) ABSTRACT

A group delay compensation equalizer is disclosed that employs a single channel four-port WDM device for compensating the group delay experienced by a plurality of wavelengths transmitted over different paths. The transmission differential between two wavelengths is compensated by transmitting the two wavelengths through two different paths where the fiber length in reflecting the second wavelength is equal to the transmission time difference between the two wavelengths. The single channel four-port group delay equalizer effectively provides a unidirectional signal flow, as compared to the conventional equalizer that transmits optical signals bi-directionally. The present invention reduces the cost of a group delay equalizer by simplifying the use of multiple three-port WDM devices into a single channel four-port WDM device. The present invention further reduces the number of alignments required to just one on the transmission side since the group delay equalizer now has one transmission output, rather than two transmission outputs in a prior solution.

12 Claims, 5 Drawing Sheets

Group delay ($\lambda 2 \ldots \lambda n$) G = L

200

US 7,457,544 B1

SINGLE CHANNEL FOUR-PORT GROUP DELAY COMPENSATION EQUALIZER

BACKGROUND OF THE INVENTION

1. Field of Invention

The invention relates generally to optical devices and more particularly to Wavelength Division Multiplexing (WDM) systems for compensating a group delay experienced from multiple wavelengths.

2. Description of Related Art

Fiber optic networks are becoming increasingly popular for data transmission due to their high speed and high data capacity capabilities. Multiple wavelengths may be transmitted along the same optical fiber. This totality of multiple combined wavelengths comprises a single composite transmitted signal. A crucial feature of a fiber optic network is the separation of the optical signal into its component wavelengths, or "channels", typically by a dense wavelength division multiplexer. This separation must occur in order for the exchange of wavelengths between signals on "loops" within networks to occur. The exchange occurs at connector points, or points where two or more loops intersect for the purpose of exchanging wavelengths.

Add/drop systems exist at the connector points for the management of the channel exchanges. The exchanging of data signals involves the exchanging of matching wavelengths from two different loops within an optical network. In other words, each signal drops a channel to the other loop while simultaneously adding the matching channel from the other loop.

Conventional methods used by dense wavelength division multiplexers in separating an optical signal into its component channels include the use of filters and fiber gratings as separators. A "separator," as the term is used in this specification, is an integrated collection of optical components functioning as a unit which separates one or more channels from an optical signal. Filters allow a target channel to pass through while redirecting all other channels. Fiber gratings target a channel to be reflected while all other channels pass through. Both filters and fiber gratings are well known in the optical art.

When transmitting multiple wavelengths, it will typically cause what is known as "a group delay", which is the delay difference between sending a first wavelength through a first path to a destination and sending a second wavelength through a second path to the destination, where the first wavelength produces a first travel time while the second wavelength produces a second travel time. To compensate for the group delay between the first and second wavelengths, a prior equalizer design employs two WDM 3-port devices in which each WDM device has two ports on one side and a single port on the other side, as shown in FIG. 1. A plurality of wavelengths or N lambda ($\lambda 1, \lambda 2 \ldots \lambda n$) 110 is transmitted into a first port 121 in a first WDM device 120 having a filter 125. The wavelength $\lambda 1$ 111 passes through the filter 125 and to a third port 123 in the first WDM device 120 and onto a first fiber path L1 130 and continues along the first fiber path L1 130 to a first port 161 in a second WDM device 160. The remaining wavelengths $\lambda 2 \ldots \lambda n$ 112 are reflected back through a second port 122 in the first WDM device 120 toward a second fiber path L2 140 and continues to a second port 162 in the second WDM device 160. The first wavelength $\lambda 1$ 111 and the reflected wavelengths $\lambda 2 \ldots \lambda n$ 112 are combined at the second WDM device 160 to produce a transmitted optical signal comprising $\lambda 1, \lambda 2 \ldots \lambda n$ 115 through a third port 163.

The total group delay is calculated by subtracting the delay through the first fiber path L1 130 from the second fiber path L2 140, and the $\delta$ constant which reflects the adjustment length inside of the two devices, represented mathematically as the group delay $(\lambda 1, \lambda 2 \ldots \lambda n)$ G=L2−L1−$\delta$. The first fiber path L1 is computed by multiplying the travel speed c by the travel time t(c*t), where the symbol c denotes the travel speed and the symbol t denotes the travel time. If the length of fiber in the first fiber path L1 130 or the second fiber path L2 140 is longer, it will translate into a longer amount of travel time.

Competitive pricing among of optical device and system companies encourages new and innovative designs that perform the same or greater functions while reducing the cost of the optical component or system. Accordingly, it is desirable to have a group delay equalizer that performs the same or similar functions but at a lower design and manufacture cost.

SUMMARY OF THE INVENTION

The present invention describes a group delay compensation equalizer that employs a single channel four-port WDM device for compensating the group delay experienced by a plurality of wavelengths transmitted over different paths. The transmission differential between the two wavelengths is compensated by transmitting the two wavelengths through two different paths where the fiber length in reflecting the second wavelength is equal to the transmission time difference between the two wavelengths. The single channel four-port group delay equalizer effectively provides a unidirectional signal flow, as compared to the conventional equalizer that transmits optical signals bi-directionally.

Broadly stated, Claim 1 recites a group delay compensation equalizer, comprising a fiber path having a first end and a second end; and a single channel four-port WDM device for compensating a group delay produced from a plurality of wavelengths, the WDM device having a filter, a first port connected to an incoming fiber, a second port connected to a first reflected fiber that couples to the first end of the fiber path, a third port connected to a second reflected fiber that couples to the second end of the fiber path, and a fourth port connected to a transmission fiber, a first wavelength in the plurality of wavelengths passing through the filter, the remaining wavelengths in the plurality of wavelengths reflecting from the filter through the second port to the first reflected fiber, the remaining wavelengths entering the third port and reflecting from the filter, the first wavelength combined with the remaining wavelengths at the filter to generate the plurality of wavelengths coupled out through the fourth port to the transmission fiber; wherein the fiber path having a fiber length L with the first end connected to the second port of the WDM device and the second end connected to the third port of the WDM device, the fiber length L being equal to the transmission difference between a first transmission delay experienced by the first wavelength and a second transmission delay experienced by the remaining wavelengths traveling through the fiber path.

Advantageously, the present invention reduces the cost of a group delay equalizer by simplifying the use of multiple three-port WDM devices into a single channel four-port WDM device. The present invention further reduces the number of alignments required to just one on the transmission side since the group delay equalizer now has one transmission output, rather than two transmission outputs in a prior solution.

The other structures and methods regarding to the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

Reference symbols or names are used in the Figures to indicate certain components, aspects or features therein, with reference symbols common to more than one Figure indicating like components, aspects of features shown therein.

DETAILED DESCRIPTION OF PREFERRED EMBODIMENT(S)

Figure 1:
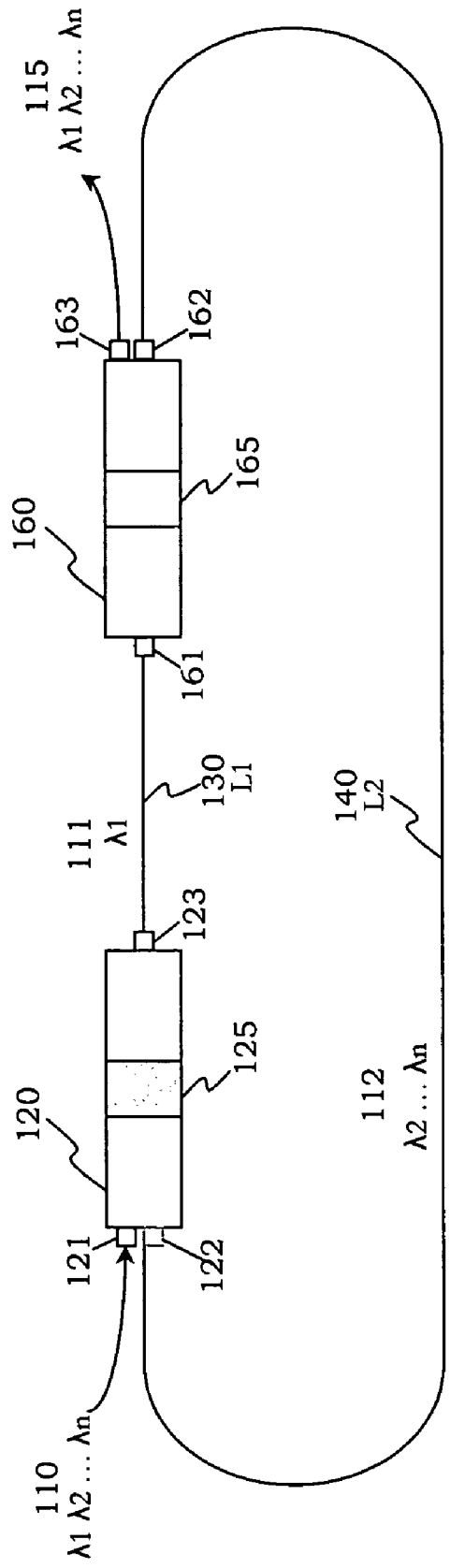
FIG. 1 is a prior art architectural diagram illustrating a group delay compensation equalizer employing two three-port devices.
Figure 2:
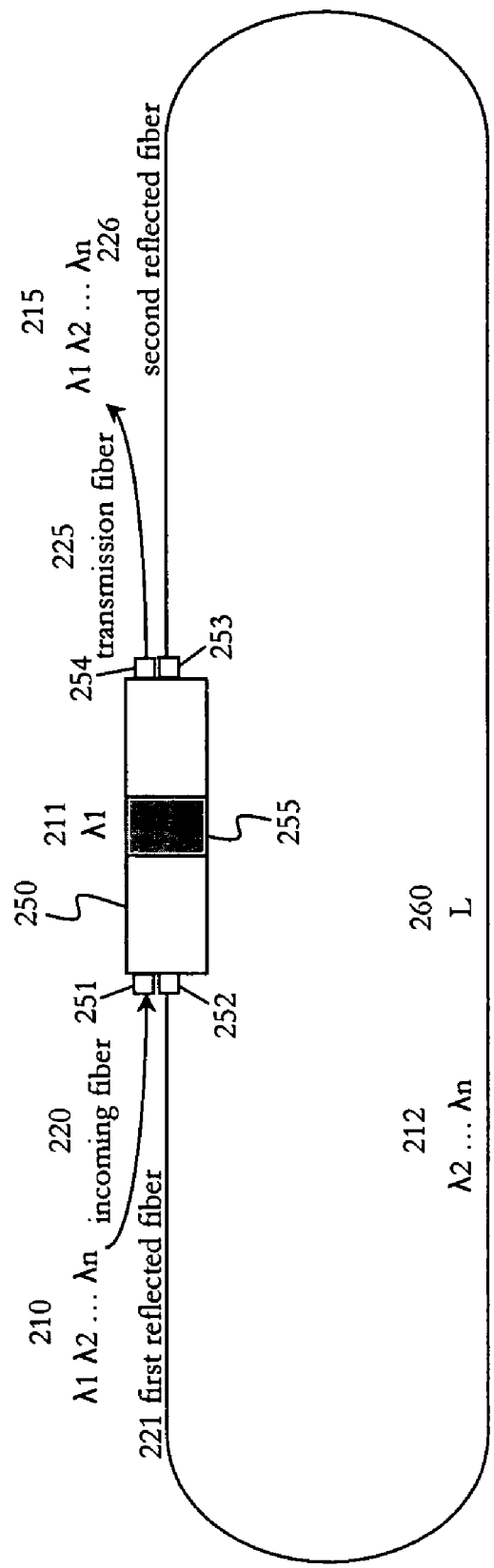
FIG. 2 is an architectural diagram illustrating a group delay compensation equalizer employing a single channel four-port device in accordance with the present invention.

Referring now to FIG. 2, there is shown an architectural diagram illustrating a group delay compensation equalizer 200 employing a single channel four-port device 250 having a first port 251 and a second port 252 on one end, and a third port 253 and a fourth port 254 on the other end. The single channel 4-port device 250 receives a composite signal containing a plurality of wavelengths, $\lambda 1, \lambda 2 \ldots \lambda n$ 210 (i.e., N lambda) from an incoming fiber 220 through the first port 251. The single channel four-port device 250 has a filter 255 for filtering the plurality of wavelengths $\lambda 1, \lambda 2 \ldots \lambda n$ 210 such that a first wavelength $\lambda 1$ 211 passes through the filter 255 while the remaining wavelengths $\lambda 2 \ldots \lambda n$ are reflected back through a second port to a first reflected fiber 221. The remaining wavelengths $\lambda 2 \ldots \lambda n$ 212 travel along an optical fiber with a length L 260 into the other end of the single channel four-port device 250. The filter 255 has an Infrared (IR) coating on each surface of the filter 255. The first surface of the filter 255 is used for reflecting to the second port 252 while the second surface of the filter 255 is used for reflecting one or more wavelengths to the fourth port 254. The remaining wavelengths $\lambda 2 \ldots \lambda n$ 212 are added back to the first wavelength $\lambda 1$ 211 to generating a plurality of wavelengths $\lambda 1, \lambda 2 \ldots \lambda n$ 215 through the fourth port 254 to a transmission fiber 225. The group delay $(\lambda 2 \ldots \lambda n)$ related to the $\lambda 1$ in the compensation equalizer 200 is equal to L 260, represented mathematically as the group delay $(\lambda 2 \ldots \lambda n) G = L + \Delta$.

The purpose of the single channel four-port compensation equalizer 200 is to compensate for the differential delays produced from the plurality of wavelengths, $\lambda 1, \lambda 2 \ldots \lambda n$ 210. For example, the wavelength $\lambda 1$ has a different transmission time than the wavelength $\lambda 2$ that travels through the fiber puts L 260 such that there exists a transmission difference between the wavelength $\lambda 1$ and wavelength $\lambda 2$. To compensate for the group delay difference, a fiber with a length L is spliced to compensate for the group delay such that the fiber length $L = c \ast t$, where the symbol c denotes the travel speed and the symbol t denotes the travel time.

Figure 3:
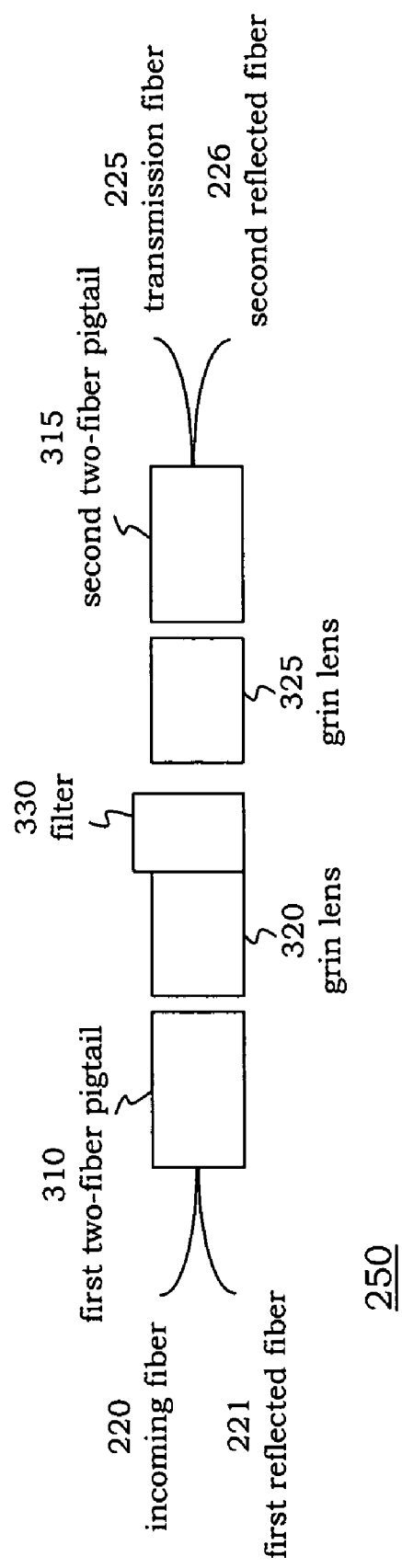
FIG. 3 is a detailed block diagram illustrating a group delay compensation equalizer in accordance with the present invention.

In FIG. 3, there is shown a detailed block diagram illustrating a group delay equalizer 250. The group delay equalizer 250 comprises a first two-fiber pigtail 310 connected to the incoming fiber 220 and the first reflected fiber 221, a grin lens 320, a filter 330, a grin lens 325, a second two-fiber pigtail 315 connected to the transmission fiber 225 and the second reflected fiber 226. The filter 330 has an IR coating on each side of the filter for reflecting one or more signals.

Figure 4:
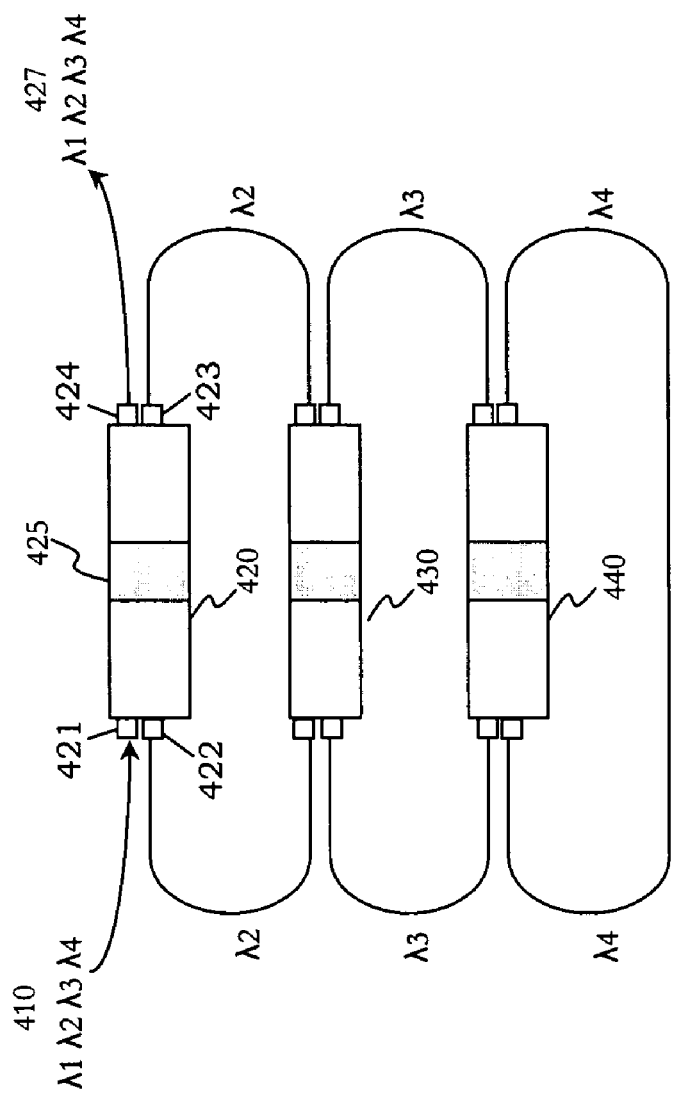
FIG. 4 is an architectural diagram illustrating a cascaded group delay compensation equalizer in accordance with the present invention.

Turning now to FIG. 4, there is shown an architectural diagram illustrating a cascaded group delay compensation equalizer 400 comprising a single channel four-port WDM device 420, a second single channel four-port WDM device 430 and a third single channel four-port WDM device 440. The first single channel four-port WDM device 420 having a first port 421 for receiving a plurality of wavelengths $\lambda 1, \lambda 2, \lambda 3$ and $\lambda 4$ 410. The first wavelength $\lambda 1$ passes through a filter 425 in the first four-port WDM device 420, while the remaining wavelengths $\lambda 2, \lambda 3$ and $\lambda 4$ are reflected back from the filter 425 to a second port 422, enter a third port 423, and reflect back from the filter 425. The first wavelength $\lambda 1$ combines with the reflected wavelengths $\lambda 2, \lambda 3$ and $\lambda 4$ to produce a composite output signal 427 comprising wavelengths $\lambda 1, \lambda 2, \lambda 3$ and $\lambda 4$ through a fourth port 424 to the transmission fiber.

Figure 5:
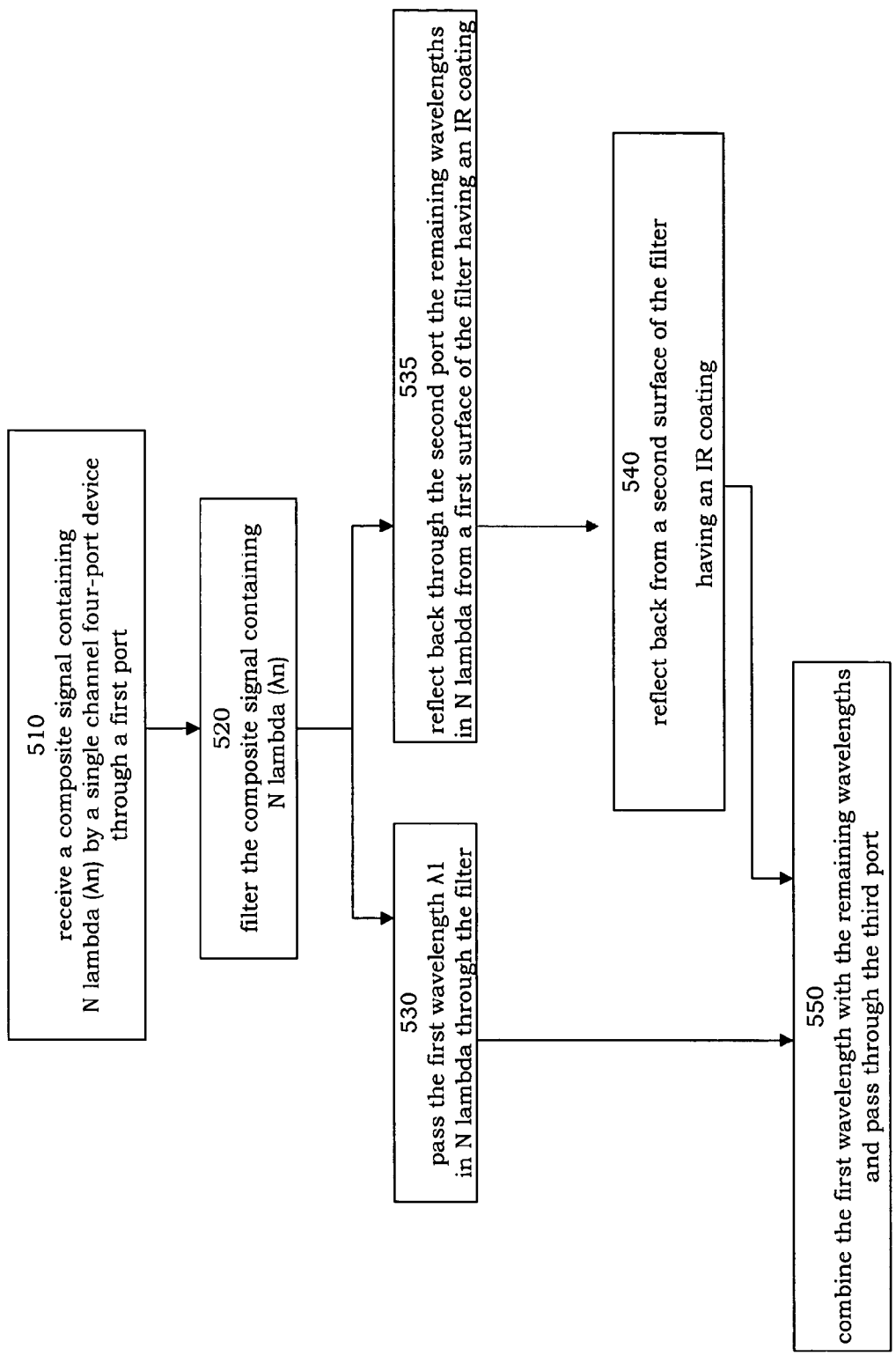
FIG. 5 is a flow diagram illustrating the process steps executed in the single channel four-port WDM device in accordance with the present invention.

FIG. 5 is a flow diagram illustrating the process steps executed in the single channel four-port WDM device 200. At step 510, the single channel four-port WDM device 200 receives the composite signal 210 through the first port 220. At step 520, the filter 255 filters the composite signal 210 by passing through the wavelength $\lambda 1$ at step 530 while reflecting back wavelengths $\lambda 2, \lambda 3$ and $\lambda 4$ through the first reflected fiber 221 at step 535. At step 540, the singe channel four-port WDM device 200 reflects back the remaining wavelengths $\lambda 2, \lambda 3$ and $\lambda 4$ from the second surface of the filter 535. At step 550, the single channel four-port WDM device 200 combines the first wavelength $\lambda 1$ with the remaining $\lambda 2, \lambda 3$ and $\lambda 4$ wavelengths through the fourth port 254.

Those skilled in the art can now appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications, whether explicitly provided for by the specification or implied by the specification, will become apparent to the skilled practitioner upon a study of the drawings, specification, and following claims.

We claim:

1. A group delay compensation equalizer, comprising:
a fiber path having a first end and a second end; and
a single channel four-port WDM device for compensating a group delay produced from a plurality of wavelengths, the WDM device having a filter comprising a first surface with an infrared coating and a second surface with an infrared coating, a first port connected to an incoming fiber, a second port connected to the first end of the fiber path, a third port connected to the second end of the fiber path, and a fourth port connected to a transmission fiber,
wherein, when a composite light signal comprising a plurality of wavelengths enters the first port, a first wavelength in the plurality of wavelengths passes through the filter, and the remaining wavelengths in the plurality of wavelengths are reflected from the filter by the first surface with the infrared coating, pass through the second port to the fiber path, enter the third port and are again reflected from the filter by the second surface with the infrared coating to be combined with the first wavelength and transmitted through the fourth port to the transmission fiber;

wherein the fiber path has a fiber length L which is equal to the transmission difference between a first transmission delay experienced by the first wavelength and a second transmission delay experienced by the remaining wavelengths traveling through the fiber path.

2. The group delay compensation equalizer of claim 1, wherein the fiber length L is computed as follows: L=c*t such that the symbol c denotes the travel speed and the symbol t denotes the travel time.

3. The group delay compensation equalizer of claim 1, wherein the WDM device includes a first grin lens adjacent a first side of the filter and a second grin lens adjacent a second side of the filter.

4. The group delay compensation equalizer of claim 3, wherein the WDM device further includes a first two-fiber pigtail adjacent the first grin lens and a second two-fiber pigtail adjacent the second grin lens.

5. A method for processing a single channel four-port group delay equalizer having a first port, a second port, a third port and a fourth port, comprising:

receiving a composite light signal having a plurality of wavelengths through the first port of the single channel four-port group delay equalizer;

passing the first wavelength in the plurality of wavelengths through a first surface having an infrared coating of a filter in the single channel four-port group delay equalizer;

reflecting back the remaining wavelengths in the plurality of wavelengths through the second port by utilizing the infrared coating on the first surface;

receiving the remaining wavelengths in the plurality of wavelengths through the third port and reflecting back the remaining wavelengths in the plurality of wavelengths via a second surface of the filter surface having an infrared coating; and combining the first wavelength and the remaining wavelengths to generate the plurality of wavelengths through the fourth port.

6. A cascaded group delay compensation equalizer, comprising a first single channel four-port WDM device for compensating a group delay experienced from a plurality of wavelengths, the first single channel four-port WDM device having a filter, a first port connected to an incoming fiber, a second port connected to a first reflected fiber, a third port connected to a second reflected fiber, and a fourth port connected to a transmission fiber, a second single channel four-port WDM device, coupled to the first single channel four-port WDM device, for compensating the group delay experienced from the plurality of wavelengths, the second single channel four-port WDM device having a second filter, a fifth port connected to the first reflected fiber, a sixth port connected to a third reflected fiber, a seventh port optically connected to the sixth port, and an eighth port connected to the second reflected fiber;

wherein a composite light signal comprising a plurality of wavelengths enters the first port, a first wavelength in the plurality of wavelengths passes through the first filter, and a first set of remaining wavelengths in the plurality of wavelengths are reflected from the first filter, and exit the first single channel four port WDM device through the second port to the first reflected fiber, and wherein the first set of remaining wavelengths enter the fifth port, a second wavelength in the plurality of wavelengths passes through the second filter, and a second set of remaining wavelengths in the plurality of wavelengths are reflected from the second filter, and exit the second single channel four port WDM device through the sixth port via the third reflective fiber, and wherein the second set of remaining wavelengths in the plurality of wavelengths enter the seventh port and are reflected again from the second filter to be combined with the second wavelength, transmitted through the eighth port to the second reflected fiber, and wherein the second set of remaining wavelengths and the second wavelength enter the third port via the second reflective fiber and are again reflected from the first filter to be combined with the first wavelength and transmitted through the fourth port to the transmission fiber.

7. The cascaded group delay compensation equalizer of claim 6, further comprising a third single channel four-port WDM device for compensating the group delay experienced from the plurality of wavelengths, the third single channel four-port WDM device having a third filter, a ninth port connected to the third reflected fiber, a tenth port connected to a fifth reflected fiber, a eleventh port connected to a sixth reflected fiber, and a twelfth port connected to the fourth reflected fiber.

8. The cascaded group delay compensation equalizer of claim 7, further comprising a fourth single channel four-port WDM device for compensating the group delay experienced from the plurality of wavelengths, the fourth single channel four-port WDM device having a fourth filter, a thirteenth port connected to the fifth reflected fiber, a fourteenth port connected to a seventh reflected fiber, a fifteenth port connected to a eighth reflected fiber, and a sixteenth port connected to the sixth reflected fiber.

9. The cascaded group delay compensation equalizer of claim 6, wherein the filter in each WDM device includes a first side and a second side having an Infrared (IR) coating.

10. The cascaded group delay compensation equalizer of claim 9, wherein each WDM device includes a first grin lens adjacent the first side of the filter and a second grin lens adjacent the second side of the filter.

11. The cascaded group delay compensation equalizer of claim 10, wherein each WDM device further includes a first two-fiber pigtail adjacent the first grin lens and a second two-fiber pigtail adjacent the second grin lens.

12. The cascaded group delay compensation equalizer of claim 6, wherein the third reflected fiber has a first end connected to the sixth port and a second end connected the seventh port.

* * * * *